United States Patent [19]

[11] 4,431,450

Hasegawa et al.

[45] Feb. 14, 1984

[54] DESENSITIZING INK FOR PRESSURE SENSITIVE COPYING SHEETS

[75] Inventors: Akira Hasegawa; Mamoru Suzuki, both of Tokyo, Japan

[73] Assignee: Jujo Paper Co., Ltd., Tokyo, Japan

[21] Appl. No.: 348,309

[22] Filed: Feb. 12, 1982

[30] Foreign Application Priority Data

Feb. 23, 1981 [JP] Japan .................................. 56/24330
Apr. 15, 1981 [JP] Japan .................................. 56/55604

[51] Int. Cl.$^3$ .............................................. C09D 11/00

[52] U.S. Cl. ........................................ 106/21; 106/23; 282/27.5; 427/150; 427/151; 427/152; 428/411; 523/400

[58] Field of Search ............................ 106/21, 19, 23; 282/27.5; 523/400, 455; 427/150, 151, 152; 428/411, 914; 252/132

[56] References Cited

U.S. PATENT DOCUMENTS

| | | | |
|---|---|---|---|
| 4,101,690 | 7/1978 | Miyamoto et al. | 106/19 |
| 4,291,102 | 9/1981 | Tsukahara et al. | 106/21 |

*Primary Examiner*—John Kight, III
*Assistant Examiner*—Amelia B. Yarbrough
*Attorney, Agent, or Firm*—Koda and Androlia

[57] ABSTRACT

A desensitizing ink for pressure sensitive copying sheets using at least a desensitizing agent, pigment and binder, wherein said desensitizing agent comprises at least propylene oxide addition compound selected from compounds of the following formulas:

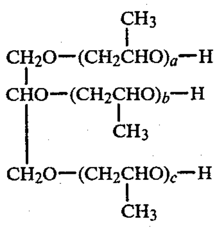

(1)

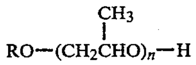

(2)

wherein a, b and c represent identical or different integers greater than 1; R is an alkyl group, an alkenyl group, an aryl group, substituted alkyl group, substituted alkenyl group or substituted aryl group; and n is an integer greater than 1. The desensitizing inks of the present invention exhibit sufficient desensitizing effect, excellent yellowing resistance and excellent printability, particularly in wet offset printing.

2 Claims, No Drawings

DESENSITIZING INK FOR PRESSURE SENSITIVE COPYING SHEETS

BACKGROUND OF THE INVENTION

1. Field of the Invention

The present invention relates to a desensitizing ink for pressure sensitive copying sheets having excellent desensitizing effects and improved yellowing resistance.

2. Prior Art

Usually, pressure sensitive copying paper consists of a combination of a top sheet (CB) with a coated layer of micro capsules containing electron-donating colorless or pale colored leuco dyes dissolved in an organic solvent (capsule oil) applied to its back surface, and a bottom sheet (CF) with a coated layer containing electron accepting developers applied to its front surface. The top sheet is superposed on the bottom sheet thus the coated surfaces face each other. When pressure is applied by a ball point pen or a typewriter, the capsules are ruptured and the capsule oil containing leuco dyes are transferred to the developer layer, so that a color-developing reaction takes place and printed records are obtained. Further, a plurality of copies can be obtained if one or more middle sheets are placed between the top and bottom sheets, the middle sheet (CFB) having the developer layer applied to its front surface and the capsules layer applied to its back surface.

When the pressure sensitive sheet is to be used for account slips or some other formats, there may be portions that do not require the copying function in the layout. To eliminate the color-developing function from the portions where no copying function is required, a desensitizing ink is usually printed on those areas of the developer layer of the middle sheet or bottom sheet.

Large amounts of the desensitizing ink are currently being used in accordance with the widespread use of pressure sensitive copying sheets, and a variety of types of ink suited to various printing systems have been placed on the market.

Representative examples of desensitizing ink used at present include oily desensitizing inks for typographic printing, solvent-type desensitizing inks for flexographic printing, and specially prepared desensitizing inks which cure upon irradiation with ultraviolet rays.

Examples of the conventional desensitizing agent used in desensitizing inks include cationic quaternary ammonium salt (such as dodecyltrimethylammonium chloride) disclosed in Japanese Patent Publication No. 3921/1958, a tertiary amine having two polyethylene oxide groups (such as N,N-di (polyoxyethylene) ethylamine) disclosed in Japanese Patent Publication No. 29546/1971, a polyoxyethylene monoalkyl ester (such as polyoxyethylene oleyl ester) disclosed in Japanese Patent Publication No. 38201/1972, a polyethylene glycol alkylphenyl ether (such as polyethylene glycol nonylphenyl ether) disclosed in Japanese Patent Publication No. 8288/1974, and the like. The desensitizing ink is generally printed by typographic printing (such as rubber relief printing), flexographic printing or gravure printing systems.

The conventional desensitizing ink, however, has defects of insufficient desensitizing effect or of yellowing properties when exposed to light, and the object of the ink is not satisfactorily accomplished.

On the other hand, the desensitizing printing is usually effected in combination with the printing of ruled lines and characters. The ruled lines and characters, in many cases, are printed by the wet offset system. Therefore, there are many users who want a desensitizing ink that can be printing by a two-color offset printer. Wet offset printing consists of supplying wetting water to hydrophilic blank portions of the printing plate, and supplying ink from an inking roller to oleophilic (water-repellant) portions free from damping water, so that the ink is transferred to the paper via the blanket to effect the printing. Such a printing system, therefore, requires an ink having a strong oleophilic property. When a hydrophilic ink is used, the paper is not evenly printed since the ink is poorly supplied to the oleophilic portions, or the ink mixes with the wetting water, contaminating the wetting water device and the nonprinted portions.

SUMMARY OF THE INVENTION

An object of the present invention is to provide a desensitizing ink having excellent desensitizing effects and yellowing resistance.

Another object of the present invention is to provide a desensitizing ink that has excellent printability in wet offset printing systems.

DETAILED DESCRIPTION OF THE INVENTION

The above and other related objects can be performed by using as a desensitizing agent at least propylene oxide addition compound selected from compounds of the following formula:

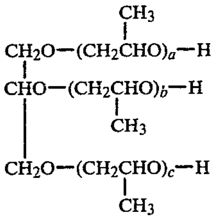

(1)

wherein a, b and c represent identical or different integers greater than 1.

The propylene oxide addition compound of the formula (1) is a triol (having three hydroxy groups) compound which is obtained by adding propylene oxide to glycerol.

These compounds of the formulas (1) and (2) can obviously be distinguished from propylene glycol (diol) and dipropylene glycol (diol) disclosed in Japanese Patent Publication No. 21448/1970 and the ethylenediamine-propylene oxide addition compound disclosed in Japanese Patent Publication No. 29365/1975 having the following general formula:

(tetraol)

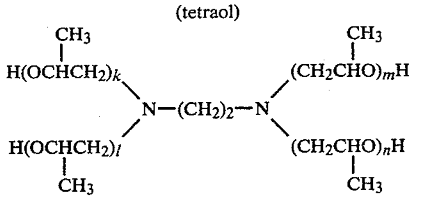

and from polypropylene glycol (diol) represented by the formula:

$$HO(CH_2\overset{\displaystyle CH_3}{\overset{|}{C}}HO)_nH$$

which is disclosed in Japanese Patent Publication No. 1919/1980.

The glycerol-propylene oxide addition compound according to the present invention exhibits remarkable desensitizing effects. It was found that particularly great desensitizing effects were exhibited when the compound has an average molecular weight of less than 7000. The glycerol-propylene oxide addition compound, on the other hand, exhibits greatly different solubility in water and viscosity depending upon the molecular weight; the solubility in water increases with the decrease in the average molecular weight. For instance, if the compound has an average molecular weight of less than 600 it completely dissolves in water. If the compound has an average molecular weight of 1000, however, it exhibits a solubility in water of 30; and if the compound has an average molecular weight of greater than 3000, it exhibits a solubility in water of less than 0.1.

If the average molecular weight is greater than 7000, the viscosity of the compound and the desensitizing ink made from it may become too high. The glycerol-propylene oxide addition compound according to the present invention can be used for desensitizing ink that can be printed by the conventional typographic printing, flexographic or gravure printing machines. In particular, the glycerol-propylene oxide addition compound having a molecular weight over the range of 1000 to 7000 has excellent printability for wet offset printing systems, and makes it possible to effect continuous printing for extended periods of time.

The desensitizing ink of the present invention comprises the above-mentioned propylene oxide addition compounds, pigments and adhesives; if necessary, the desensitizing ink of the present invention may contain setoff preventing agents, wax compounds and anti-oxidizing agents.

Examples of the pigment may be such inorganic pigments as titanium oxide, zinc oxide, barium sulfate, magnesium carbonate, calcium carbonate, barium carbonate, magnesium hydroxide and talc. Examples of the adhesive will include high-molecular compounds such as ketone resin, polyamide resin, maleic acid resin, phenolic resin, alkyd resin, melamine resin, urea resin and the like.

The desensitizing ink can be prepared by a variety of methods. Generally, the desensitizing ink is prepared by melting adhesives in the desenstizer under heated conditions to prepare a varnish, followed by the addition of pigments. The mixture is then evenly kneaded by a three-bar roll mill. In this case, the desensitizer will be blended in an amount of 20 to 60 parts by weight, the pigment in an amount of 10 to 40 parts by weight and the adhesive agent in an amount of 10 to 40 parts by weight.

The invention will be more specifically described by way of examples. It should be noted that the invention is not restricted to those examples.

EXAMPLE 1

| Composition: | |
|---|---|
| Glycerol-propylene oxide addition compound (average molecular weight 1000) | 50 parts by weight |
| Maleic acid resin | 20 parts by weight |
| Titanium oxide | 20 parts by weight |
| Calcium carbonate | 10 parts by weight |

A densitizing ink of the above composition was prepared as follows. First, 20 parts by weight of the maleic acid resin was added to 50 parts by weight of glycerol-propylene oxide addition compound and the mixture was heated and melted at 150° C. for 30 minutes to prepare a varnish. Then, 20 parts by weight of titanium oxide and 10 parts by weight of calcium carbonate were added to the varnish. The mixture was sufficiently stirred by a mixer and evenly kneaded by a three-bar roll mill to obtain the desensitizing ink.

EXAMPLE 2

A desensitizing ink of the following composition was prepared in the same manner as in Example 1.

| | |
|---|---|
| Glycerol-propylene oxide addition Compound (average molecular weight 3000) | 55 parts by weight |
| Rosin-modified maleic acid | 20 parts by weight |
| Titanium oxide | 25 parts by weight |

EXAMPLE 3

A desensitizing ink of the following composition was prepared in the same manner as in Example 1.

| | |
|---|---|
| Glycerol-propylene oxide addition compound (average molecular weight 4000) | 45 parts by weight |
| Rosin-modified phenolic resin | 25 parts by weight |
| Titanium oxide | 25 parts by weight |
| Magnesium carbonate | 5 parts by weight |

EXAMPLE 4

A desensitizing ink was prepared as in Example 1 with the same amount of glycerol-propylene oxide addition compound (average molecular weight 300) as in Example 1 instead of using the glycerol-propylene oxide addition compound (average molecular weight 1000).

EXAMPLE 5

A desensitizing ink was prepared as in Example 2 with the same amount of a glycerol-propylene oxide addition compound (average molecular weight 600) instead of the glycerol-propylene oxide addition compound (average molecular weight 3000).

COMPARATIVE EXAMPLE 1

A desensitizing ink of the following composition was prepared in the same manner as in Example 1.

| | |
|---|---|
| Propylene glycol | 60 parts by weight |
| Rosin-modified maleic acid resin | 20 parts by weight |
| Titanium oxide | 15 parts by weight |
| Calcium carbonate | 5 parts by weight |

COMPARATIVE EXAMPLE 2

A desensitizing ink was prepared as in Comparative Example 1 with the same amount of polyethylene glycol nonylphenyl ether (the mol number of ethylene oxide addition is 1) instead of propylene glycol.

COMPARATIVE EXAMPLE 3

A desensitizing ink was prepared as in Example 3 with the same amount of polyethylene glycol nonylphenyl ether (the mol number of ethylene oxide addition is 12) instead of the glycerol-propylene oxide addition compound (average molecular weight 4000).

COMPARATIVE EXAMPLE 4

A desensitizing ink was prepared as in Comparative Example 1 with the same amount of dodecyltrimethyl ammonium chloride instead of the propylene glycol.

The desensitizing inks obtained in Examples 1 through 5 and Comparative Examples 1 through 4 were printed onto the developer-coated surface of a bottom sheet of a pressure sensitive copying sheet of JUJO PAPER CO., LTD. (NW 40 BR) by a wet offset printing machine (manufactured by MIYAKOSHI PRINTING MACHINERY CO., LTD.) and a typographic printing machine (manufactured by MIYAKOSHI PRINTING MACHINERY CO., LTD.) at applicating weight of 2 to 3 g/m$^2$. Then, the printing sheets were examined desensitizing effect, yellowing resistance and printability by the following methods.

(1) Desensitizing Effect:

A top sheet (KW 40 T) manufactured by JUJO PAPER CO., LTD. was superposed on the portion where the desensitizing ink was applied, and characters were printed with a typewriter to evaluate the color-developing condition.

(2) Yellowing Resistance:

The surface applied with the desensitizing ink was evaluated in regard to its yellowing resistance with Fade-o-Meter (manufactured by TOYO SEIKI SEISAKUSHO CO., LTD.) after exposure to a carbon arc lamp for 10 hours.

(3) Printability:

Contamination of the wetting water applicating device of the printing machine when the wet offset printing was effected and contamination in the non-described portion of the bottom sheet was evaluated in order to examine the wet offset printability.

The results of the tests are shown in Table 1.

TABLE 1

| Example and Comparative Example Nos. | Desensitizing Agent | Desensitizing effect | Yellowing Resistance | Printability Typographic | Printability Wet Offset |
|---|---|---|---|---|---|
| Example 1 | Glycerol-propylene oxide addition compound (average molecular weight 1000) | O | O | O | O |
| Example 2 | Glycerol-propylene oxide addition compound (average molecular weight 3000) | O | O | O | O |
| Example 3 | Glycerol-propylene oxide addition compound (average molecular weight 4000) | O | O | O | O |
| Example 4 | Glycerol-propylene oxide addition compound (average molecular weight 300) | O | O | O | X |
| Example 5 | Glycerol-propylene oxide addition compound (average molecular weight 600) | O | O | O | X |
| Comparative Example 1 | Propylene glycol | Δ | O | O | X |
| Comparative Example 2 | Polyethylene glycol nonylphenyl ether (mole number of ethylene oxide addition is 1) | X | Δ | O | O |
| Comparative Example 3 | Polyethylene glycol nonylphenyl ether (mole number of ethylene oxide addition is 12) | O | Δ | O | X |
| Comparative Example 4 | Dodecyltrimethyl ammonium chloride | Δ | X | O | X |

Note:
The mark O represents that the ink can be commercially used, the mark Δ represents that the ink can be used but is not suited for commercial use, and the mark X represents that the ink is not commercially usable.

Excellent properties of the desensitizing inks of the present invention are obvious from Table 1.

That is, the desensitizing inks of Comparative Examples 1 through 4 are not capable of satisfying both the desensitizing effect and yellowing resistance. The desensitizing inks according to Examples 1 through 5 of the present invention, on the other hand, exhibit sufficient desensitizing effects as well as yellowing resistance. Moreover, the desensitizing inks of Examples 1 through 3 employing a glycerol-propylene oxide addition compound having an average molecular weight greater than 1000 as a desensitizer exhibit excellent properties even when they are used as desensitizing inks in wet offset printing.

We claim:

1. A desensitizing ink for pressure sensitive copying sheets using at least a desensitizing agent, pigment and binder, wherein said desensitizing agent comprises propylene oxide addition compound of following formula:

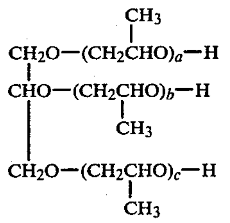

(1)

wherein a, b and c represent identical or different integers greater than 1.

2. A desensitizing ink according to claim 1, wherein said glycerol-propylene oxide addition compound of the formula (1) with an average molecular weight of 1000 (a+b+c=15) to 7000 (a+b+c=119) is used for wet offset printing.

* * * * *